(12) United States Patent
Mons

(10) Patent No.: US 8,448,446 B2
(45) Date of Patent: May 28, 2013

(54) ACTUATING DEVICE, BYPASS AIR BLEED SYSTEM EQUIPPED THEREWITH, AND TURBOJET ENGINE COMPRISING THESE

(75) Inventor: Claude Marcel Mons, Savigny le Temple (FR)

(73) Assignee: SNECMA, Paris (FR)

(*) Notice: Subject to any disclaimer, the term of this patent is extended or adjusted under 35 U.S.C. 154(b) by 1301 days.

(21) Appl. No.: 12/204,347

(22) Filed: Sep. 4, 2008

(65) Prior Publication Data

US 2009/0056307 A1 Mar. 5, 2009

(30) Foreign Application Priority Data

Sep. 5, 2007 (FR) ...................................... 07 06212

(51) Int. Cl.
*F02C 6/08* (2006.01)
(52) U.S. Cl.
CPC ........................................ *F02C 6/08* (2013.01)
USPC .................................. 60/782; 60/785; 251/11
(58) Field of Classification Search
CPC ........................................................ F02C 6/08
USPC .................... 60/782, 784–785; 251/11, 12
See application file for complete search history.

(56) References Cited

U.S. PATENT DOCUMENTS

| 2,654,994 | A | * | 10/1953 | Morris ........................ 60/39.281 |
| 3,915,587 | A | * | 10/1975 | Rannenberg .................... 415/27 |
| 4,083,181 | A | * | 4/1978 | Adamson ..................... 60/39.52 |
| 5,305,616 | A | * | 4/1994 | Coffinberry .................... 62/402 |
| 6,151,897 | A | | 11/2000 | Baumbick |
| 6,348,067 | B1 | * | 2/2002 | Baum et al. .................. 623/1.19 |
| 6,367,250 | B1 | * | 4/2002 | Baumbick ....................... 60/527 |
| 2005/0103008 | A1 | * | 5/2005 | Gummin et al. ................ 60/527 |
| 2007/0191831 | A1 | * | 8/2007 | Sanders et al. ................. 606/61 |
| 2008/0112798 | A1 | * | 5/2008 | Seitzer et al. ................ 415/144 |

FOREIGN PATENT DOCUMENTS

| EP | 0 340 364 | | 11/1989 |
| EP | 0 902 179 A2 | | 3/1999 |
| EP | 1 531 236 A2 | | 5/2005 |
| JP | 61-31786 | * | 2/1986 |
| JP | 62-7980 | | 1/1987 |

* cited by examiner

*Primary Examiner* — Ehud Gartenberg
*Assistant Examiner* — Andrew Nguyen
(74) *Attorney, Agent, or Firm* — Oblon, Spivak, McClelland, Maier & Neustadt, L.L.P.

(57) ABSTRACT

An actuating device for opening and closing at least one shutter in a gas turbine engine, such as a turbojet engine, includes at least one actuator made of a two-way shape memory alloy having a first stable state at a first temperature in which state it actuates either the opening or the closing of the shutter, and a second stable state at a second temperature, in which state it actuates either the closing or the opening of the shutter, respectively.

17 Claims, 4 Drawing Sheets

ACTUATING DEVICE, BYPASS AIR BLEED SYSTEM EQUIPPED THEREWITH, AND TURBOJET ENGINE COMPRISING THESE

BACKGROUND OF THE INVENTION

The present invention relates to the field of gas turbine engines and more particularly to that of bypass turbojet engines.

It relates more specifically to a device for actuating a shutter in a turbojet engine, to a bypass air bleed system equipped with such an actuating device, and to a turbojet engine comprising these.

An aircraft bypass turbojet engine comprises, as is known, a primary gas flow duct and a secondary gas flow duct, which ducts are separated by an inter-duct compartment of an intermediate casing. Positioned in the primary duct, from the upstream direction downstream with respect to the direction in which the gases flow, are a low-pressure compressor and a high-pressure compressor. The air thus compressed is conveyed to a combustion chamber in which it is mixed with pressurized fuel which is burnt to provide, downstream of the combustion chamber, energy to a high-pressure turbine which drives the high-pressure compressor and then to a low-pressure turbine which drives the fan and the low-pressure compressor. The gases leaving the turbines provide residual thrust which is added to the thrust generated by the gases flowing through the secondary duct in order to provide the motive power for the aircraft.

Under certain flight conditions the amount of air delivered by the low-pressure compressor is too high to guarantee correct operation of the turbojet engine, and so it is necessary to divert some of this air from the primary duct to the secondary duct so as to avoid the onset of the phenomenon known as surge which is caused by the separation of the streams of fluid along the vanes and which causes instability in the flow. These openings can also be used to remove foreign bodies such as ice or water ingested by the engine.

This diverting of air is also known as air bleeding. It is performed using bypass air bleed systems which employ articulated moving shutters actuated simultaneously by a set of actuating means.

DESCRIPTION OF THE PRIOR ART

A well-known conventional bypass air bleed system is depicted in FIG. 1. The air bleed system 130 is positioned in the inter-duct compartment 8 which separates the primary duct 4 from the secondary duct 6. It comprises moving shutters 132 actuated by jacks 134 which are generally hydraulic jacks but which may be mechanical jacks such as endless screws for example. A computer regularly receives information from sensors located at appropriate points in the turbojet engines, such as, for example, temperature sensors detecting the thermodynamic temperature measured at the low-pressure guide vanes, and sometimes pressure sensors sensing pressure measured at the stationary vanes of the compressors, for example, and speed sensors sensing the rotational speed of the rotors. On the basis of this information, the computer determines the thermodynamic cycle of the turbojet engine, at each moment. As the surge zone is approached or when the conditions for the onset of surge are all simultaneously present, the computer initiates operation of the jacks, which actuate the bypass air bleed shutters in order to bleed air off.

Such jack-operated actuating devices have disadvantages. Specifically, actuating hydraulic jacks entails the use of hydraulic fluids or of air compressed to a high pressure and the means of conveying such fluids from the hydraulic pumps, while actuation of mechanical jacks entails the presence of electric drive motors as well as current generators and wiring. All these ancillary systems are heavy and bulky.

Another actuating device for a known bypass air bleed system is disclosed in document U.S. Pat. No. 6,151,897. It overcomes the abovementioned disadvantages in that the bypass air bleed shutters are actuated not by jacks but by shape memory alloy actuators which are activated by the thermal energy from high-temperature gases or optical sources. In the case of actuators which are activated by high-temperature gases, the source of these high-temperature gases may be a compressor or a turbine of the turbojet engine.

Shape memory alloys are well known for their applications in the field of actuators. A shape memory alloy is capable of converting a thermal power into mechanical work. When heated, it is capable of passing on deformations of the order of 6 to 8% and generating very high forces. For example, an object made of shape memory alloy is capable of lifting up to 1000 times its own mass. This force resulting from the displacement can be amplified by known mechanical means such as lever arms or pistons.

The way in which shape memory alloys work is based on the thermal and mechanical stresses of the material. There are one-way shape memory alloys and two-way shape memory alloys. They behave as follows:

in the case of a one-way shape memory alloy:

The alloy is initially in a stable state (austenite state) in a stable shape; next, stress is applied to it at constant temperature and it becomes deformed (martensite state); if heated, it returns to the austenite state, and therefore returns to its initial shape that it has "memorized"; a one-way shape memory alloy therefore has just one stable state at high temperature;

in the case of a two-way shape memory alloy:

The material undergoes a "learning process" whereby a thermal cycle analogous to the cycle described hereinabove in the case of a one-way shape memory alloy is applied to it a great many times; the external stresses applied are then replaced by internal stresses within the material; if it is heated, it passes to a high-temperature stable state (austenite state) in which it has a memorized stable shape; if it is cooled, it passes to another, low-temperature, stable state (martensite state) in which it has another memorized stable shape; a two-way shape memory alloy therefore has two stable states, one at "high temperature" and the other at "low temperature".

SUMMARY OF THE INVENTION

It is an object of the present invention to alleviate the disadvantages relating to the actuating devices that employ high-pressure jacks and the invention proposes an actuating device in the form of a shape memory alloy which is an improvement over the actuating device described in document U.S. Pat. No. 6,151,897.

A first aspect of the invention relates to an actuating device for opening and closing at least one shutter in a gas turbine engine comprising an actuator made of a two-way shape memory alloy having a first stable state at a first given temperature, in which state it actuates either the opening or the closing of the shutter, and a second stable state at a second given temperature in which state it actuates the other one of the closing or opening of said shutter, respectively, and temperature regulating means for bringing the shape memory alloy actuator to the first given temperature or to the second given temperature, and has a regulating valve and a connecting pipe connected to the regulating valve and a first feed pipe connected to a first source of a fluid brought to the first given temperature and a second feed pipe connected to a second source of a fluid brought to the second given temperature, the first and second feed pipes being connected to the regulating valve.

The actuating device is used in an engine comprising at least one element through which a fluid flow passes and having an inlet where the fluid is at a given inlet temperature and an outlet where the fluid is at a given outlet temperature. As a preference, the first source of fluid consists of either the inlet or the outlet while the second source of fluid consists of either the outlet or the inlet, respectively.

According to one embodiment, the element is a compressor of the engine, the first given temperature is the air temperature at the inlet to a compressor stage and the second given temperature is the air temperature at the outlet from this stage or the following stage of the compressor.

According to another embodiment, the element is a turbine of the engine, the first given temperature is the air temperature at the outlet from the turbine and the second given temperature is the air temperature at the inlet to the turbine.

The actuating device preferably comprises at least one heat insulated in which the shape memory alloy actuator is positioned. The connecting pipe opens into the heat insulated.

The heat insulated is advantageously equipped with a leakage so that it can be quickly fed with hot or cold air as need be; the "normal" surrounding temperature of the memory alloy component corresponds to the valve being in the closed position. When the supply of hot or cold air is removed, the spring returns to its ambient temperature and returns to the position of equilibrium of the valve. Speed of response for this return may advantageously be improved by a third tapping or by using a scoop positioned in the primary or secondary flow stream.

According to a first embodiment of the actuating device, this device comprises a single two-way shape memory alloy actuator which switches to a first stable state when brought to a first given temperature and to a second stable state when brought to a second given temperature.

According to a second embodiment of the actuating device, this device comprises:
  a first two-way shape memory alloy actuator which switches to a first stable state when brought to its first given temperature and which switches to a second stable state when brought to its second given temperature,
  a second two-way shape memory alloy actuator which switches to a first stable state when brought to its first given temperature and which switches to a second stable state when brought to its second given temperature.

In particular, the first given temperature of the second actuator is substantially identical to the second given temperature of the first actuator and the second given temperature of the second actuator is substantially identical to the first given temperature of the first actuator, so that the first stable state of the second actuator is identical to the second stable state of the first actuator and so that the second stable state of the second actuator is identical to the first stable state of the first actuator.

According to an alternative form of embodiment, the actuator is a coil spring. According to another alternative form of embodiment, the actuator is a leaf spring.

The invention also relates to a turbojet engine comprising a primary air flow duct and a secondary air flow duct and a bypass air bleed system comprising at least one bypass air bleed shutter allowing air to be diverted from the primary duct to the secondary duct, the bypass air bleed system comprising at least one actuating device according to the invention for opening or closing the bypass air bleed system.

In the known way, the turbojet engine comprises at least one element through which a fluid flow passes and having an inlet where the fluid flow is at a given inlet temperature and an outlet where the fluid flow is at a given outlet temperature. This element is, for example, a compressor of the turbojet engine. According to one particular embodiment, the bypass air bleed system comprises at least one actuating device comprising a regulating valve fed via a first feed pipe connected to either the inlet or outlet of said element and by a second feed pipe connected from either the outlet or the inlet of said element, respectively, and possibly a third tapping for rapid return to equilibrium and the regulating valve is controlled by a computer that receives data relating to the operating cycle of the turbojet engine.

One advantage of the actuating system according to the invention lies in the fact that it is lighter in weight and more compact than the actuating devices of the known art which employ jacks and their ancillaries. It does not use high-pressure liquids that require special precautions, and neither does it employ electric power generators.

BRIEF DESCRIPTION OF THE DRAWINGS

The invention will be better understood from reading the detailed description which follows of some particular embodiments which are provided by way of entirely non-limiting indication illustrated by the attached drawings in which.

DESCRIPTION OF THE PREFERRED EMBODIMENTS

Figure 2:
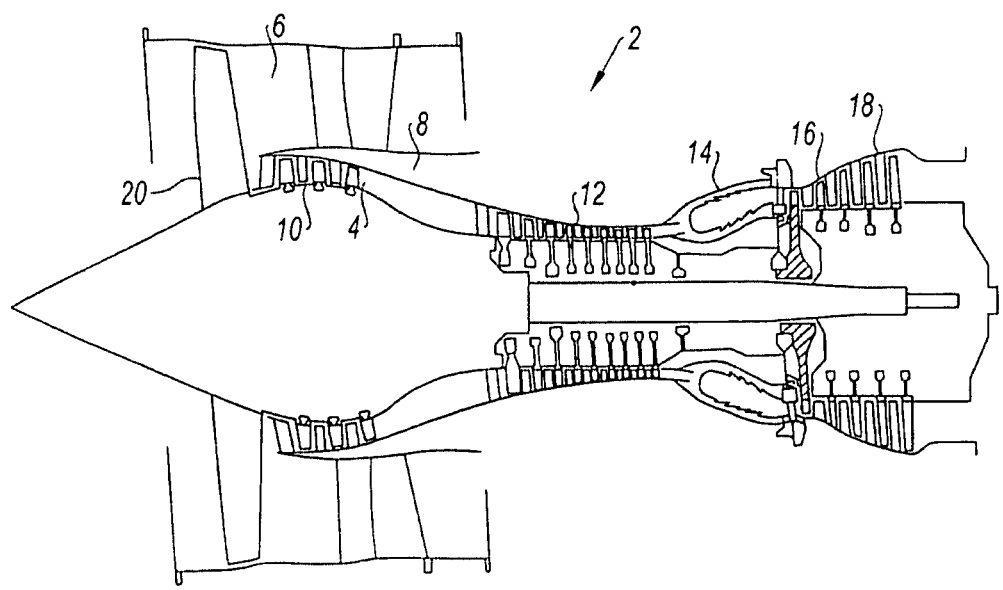
FIG. 2 depicts, in axial section and schematically, a turbojet engine in which there is installed a bypass air bleed system that has at least one actuating device according to the invention.

An aircraft bypass turbojet engine is depicted in FIG. 2. The turbojet engine, denoted by the reference 2, comprises, in a known way, a primary gas flow duct 4 and a secondary gas flow duct 6, these ducts being separated by an inter-duct compartment 8. The turbojet engine also comprises a low-pressure compressor 10, a high-pressure compressor 12, a combustion chamber 14, a high-pressure turbine 16 which drives the high-pressure compressor 12, and a low-pressure turbine 18 which drives a fan 20 and the low-pressure compressor 10.

Figure 3:
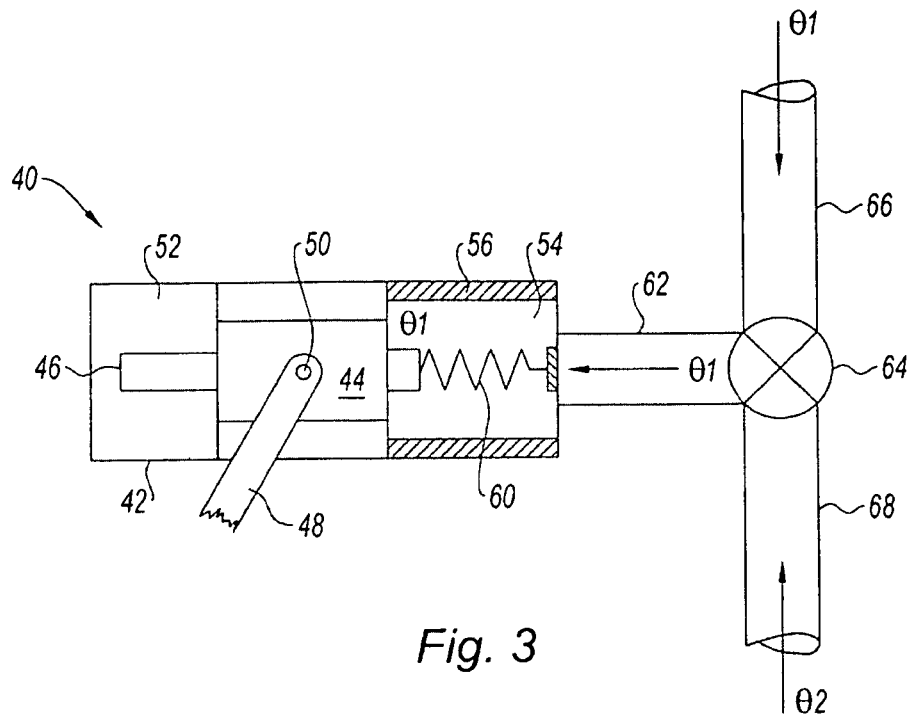
FIGS. 3 and 4 schematically depict a first embodiment of an actuating device according to the invention and of the operation thereof.
Figure 4:
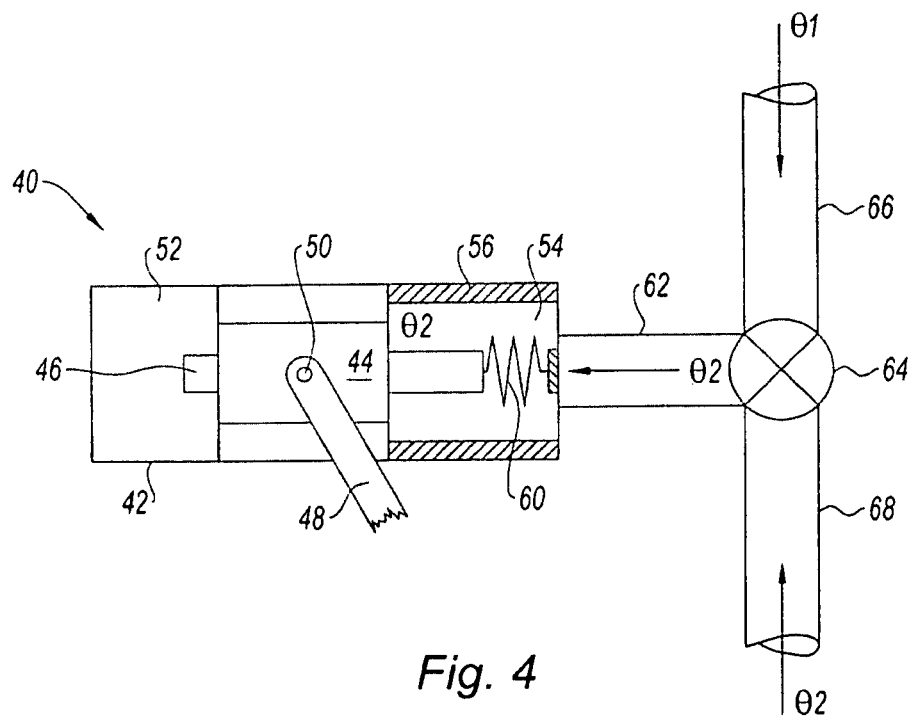

FIGS. 3 and 4 schematically illustrate how an actuating device 40 according to a first embodiment of the invention works. The actuating device 40 comprises a casing 42 in which there is housed a mechanism 44 comprising a piston 46 capable of performing a translational movement between a first position illustrated in FIG. 3 and a second position illustrated in FIG. 4.

The mechanism 44 also comprises a crank 48 capable of rotating about an axle 50 between a first position illustrated in FIG. 3 and a second position illustrated in FIG. 4. The rotation of the crank 48 about the axle 50 is caused by the translational displacement of the piston 46, by means of an intermediate member such as, for example, a lever or a hydraulic piston which has not been depicted in FIGS. 3 and 4.

The casing 42 also has two housings 52, 54 positioned respectively one on each side of the mechanism 44. These two housings 52, 54 are each capable of housing part of the piston 46 during its translational movement. One 54, of these housings 52, 54 comprises thermal insulation means 56 such as, for example, fibrous coverings (for example those known by the name of Fiberfrax), ceramic or organic deposits filled with hollow beads so as to form a heat insulated 54. These heat insulated are equipped with calibrated leakages so that ventilating air can be circulated quickly.

The actuating device 40 also comprises a coil spring 60 which actuates the piston 46 in its translational movement. This coil spring 60 is made of a two-way shape memory alloy. One of the ends of the coil spring 60 is attached to that one of the two ends of the piston 46 which moves in the heat insulated 54, while the other end of the coil spring 60 is attached to a wall of the heat insulated 54 which faces the end of the piston 46. The coil spring 60 can thus compress and expand in a direction parallel to the path of the piston 46.

The actuating device 40 also comprises a connecting pipe 62 which opens into the heat insulated 54 and which is connected to a regulating valve 64. This regulating valve 64 is fed via a first feed pipe 66 and via a second feed pipe 68. The first feed pipe 66 connects the regulating valve 64 to a first source of fluid (not depicted) which supplies a fluid brought to a first given temperature θ1 while the second feed pipe 68 connects the regulating valve 64 to a second source of fluid (not depicted) which supplies a fluid at a second given temperature θ2. An additional feed pipe or scoops that allow the system to be stabilized quickly in the closed position, may be added.

The two given temperatures θ1 and θ2 are different temperatures separated by a temperature range of at least 40°. As a preference, this temperature range is between 40° and 80°. As an even greater preference, this temperature range is in excess of 120°.

The way in which the actuating device 40 according to the first embodiment works is as follows.

The regulating valve 64 can receive fluid at the first given temperature θ1, this fluid coming from the first air source (not depicted) via the first feed pipe 66, or alternatively, it may receive a fluid at the second given temperature θ2 from the second fluid source (not depicted) via the second feed pipe 68.

Which of the two feed pipes 66, 68 is the one feeding the regulating valve 64 is controlled by a computer (not depicted) on the basis of parameters relating to the thermodynamic cycle of the turbojet engine which parameters are continuously fed to the computer via sensors positioned appropriately within the turbojet engine. When the turbojet engine operating cycle approaches a critical zone in which a surge phenomenon may occur, the computer commands a feed to the regulating valve 64.

The fluid at the given temperature θ1 (FIG. 3) or θ2 (FIG. 4) which is fed to the regulating valve 64 is then conveyed via the connecting pipe 62 as far as the heat insulated 54 containing the two-way shape memory alloy spring 60. According to the invention, this shape memory alloy is selected such that it lies in its first stable state when brought to the first given temperature θ1 and lies in its second stable state when brought to the second given temperature θ2. The first stable state of the shape memory alloy of which the spring 60 is made corresponds to a state in which the spring 60 is relaxed (FIG. 3), while its second stable state corresponds to a state in which the spring 60 is compressed (FIG. 4).

Thus, in a first configuration (FIG. 3), the heat insulated 54 receives a fluid at the first given temperature θ1. The two-way shape memory alloy spring 60 is therefore automatically brought to the first given temperature θ1 and is held there because the housing 54 is lagged. The spring 60 adopts its first stable state, which in the example illustrated, corresponds to its being expanded, and remains in that state because the housing 54 is lagged. By expanding, the spring 60 pushes against the piston 46 which causes the crank 48 to rotate to a first extreme position.

Symmetrically, in a second configuration (FIG. 4), the heat insulated 54 receives a fluid at the second given temperature θ2. The two-way shape memory alloy spring 60 is then automatically brought to the second given temperature θ2 and held there because the housing 54 is lagged. The spring 60 adopts its second stable state, which corresponds to its being compressed in the example illustrated, and remains there because the housing 54 is lagged. On compressing, the spring 60 pulls on the piston 46 which drives the rotation of the crank 48 into a second extreme position.

That end of the crank 48 which is not depicted in FIGS. 3 and 4 is connected to a shutter (not depicted) or to a mechanism (not depicted) itself connected to one or more shutter(s) (not depicted). One of the two extreme positions of the crank 48 corresponds to either the open or closed position of the shutter, while the other of the two extreme positions of the crank 48 corresponds to either the closed or open position of said shutter, respectively.

Figure 5:
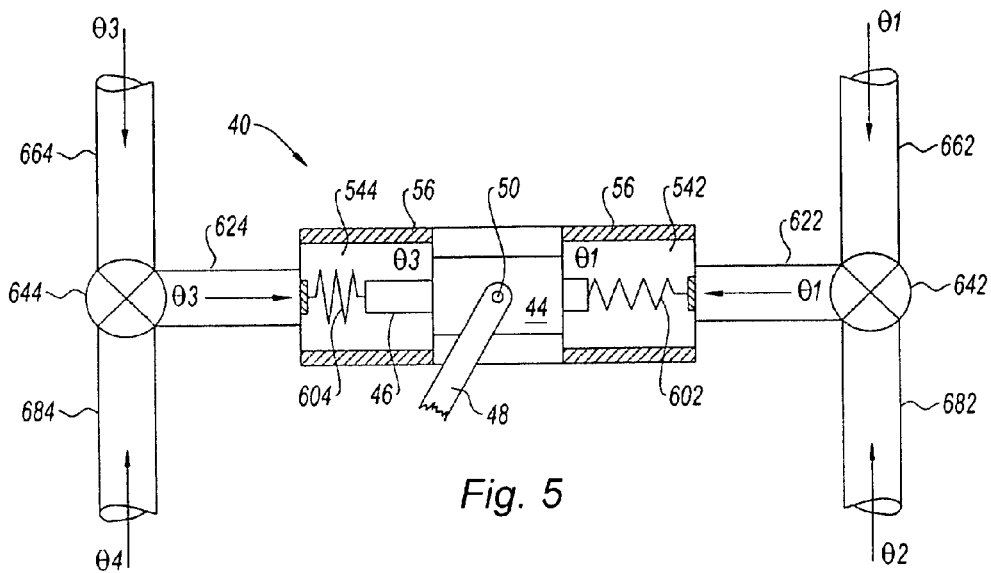
FIGS. 5 and 6 schematically depict a second embodiment of an actuating device according to the invention and the operation thereof.
Figure 6:
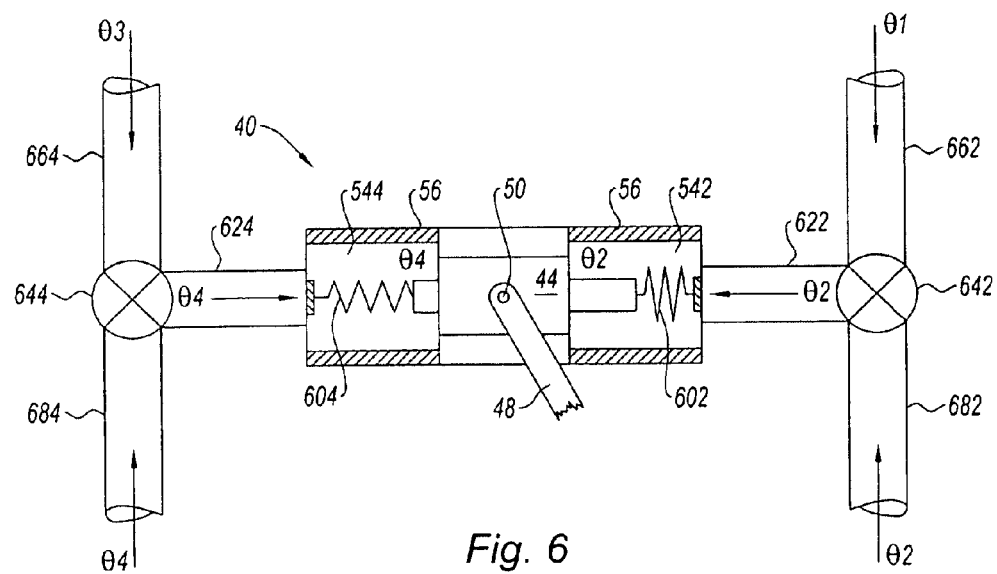

FIGS. 5 and 6 schematically illustrate how an actuating device 40 according to a second embodiment of the invention works.

The actuating device 40 comprises a casing 42 housing a mechanism 44 comprising a piston 46 able to perform a translational movement between a first position illustrated in FIG. 5 and a second position illustrated in FIG. 6. Just as in the first embodiment, the mechanism 44 comprises a crank 48 and an axle 50. The casing 42 has two housings 542, 544 positioned one on each side of the mechanism 44 and each capable of housing part of the piston 46 during its translational movement.

According to the second embodiment, each of these housings 542, 544 comprises thermal insulation means 56 so as to form two heat insulated 542, 544.

The actuating device 40 comprises two two-way shape memory alloy coil springs 602, 604 which actuate the piston 46 in its translational movement. Each coil spring 602, 604 has one end attached to that one of the two ends of the piston 46 which moves in the heat insulated 542, 544 in which it is housed, while the other end of this coil spring 602, 604 is attached to a wall of the heat insulated 542, 544 which faces the end of the piston 46. Each coil spring 602, 604 is thus able to compress and to expand in the direction parallel to that of the path of the piston 46. Each coil spring 602, 604 expands when the other coil spring 604, 602 compresses, and compresses when the other coil spring 604, 602 expands.

The first heat insulated 542 is brought to a first given temperature θ1 or to a second given temperature θ2 by first temperature regulating means 622, 642, 662, 682 comprising a connecting pipe 622, a regulating valve 642, a first feed pipe 662 and a second feed pipe 682.

The second heat insulated 544 is brought to a third given temperature θ3 or to a fourth given temperature θ4 by second temperature regulating means 624, 644, 664, 684 comprising a connecting pipe 624, a regulating valve 644, a first feed pipe 664 and a second feed pipe 684.

These feed pipes 662, 682, 664, 684 are connected to fluid sources similar to those described in respect of the first embodiment of the activating device. The criteria governing selection of what is fed to the regulating valves 642, 644 are identical to those described in respect of the first embodiment.

The way in which the actuating device 40 according to the second embodiment works is as follows.

The first coil spring 602 positioned in the first heat insulated 542 is made of a two-way shape memory alloy which is selected in such a way that it lies in its first stable state when brought to the first given temperature $\theta 1$ and lies in its second stable state when brought to the second given temperature $\theta 2$. The first stable state of the shape memory alloy of which the spring 602 is made corresponds to a state in which the spring 602 is relaxed (FIG. 5) while its second stable state corresponds to a state in which the spring 602 is compressed (FIG. 6).

The second coil spring 604 positioned in the second heat insulated 544 is made of a two-way shape memory alloy which is selected such that it lies in its first stable state when it is brought to the third given temperature $\theta 3$ and lies in its second stable state when brought to the fourth given temperature $\theta 4$. The first stable state of the shape memory alloy of which the spring 604 is made corresponds to a state in which the spring 604 is compressed (FIG. 5), while its second stable state corresponds to a state in which the spring 604 is relaxed (FIG. 6).

Hence, in a first configuration (FIG. 5), the first heat insulated 542 receives a fluid at the first given temperature $\theta 1$. The first two-way shape memory alloy spring 602 is therefore automatically brought to the first given temperature $\theta 1$ and adopts its first stable state which corresponds to expansion in the example illustrated, and remains there because the first housing 542 is lagged. At the same time, the second heat insulated 544 receives a fluid at the third given temperature $\theta 3$. The second two-way shape memory alloy spring 604 is then automatically brought to the third given temperature $\theta 3$ and adopts its first stable state which corresponds to compression in the example illustrated, and remains there because the second housing 544 is lagged. The combination of the expansion of the first spring 602 and of the compression of the second spring 604 has the effect of pushing the piston 46 in a first direction thus driving the rotation of the crank 48 into a first extreme position. Symmetrically in a second configuration (FIG. 6), the first heat insulated 542 receives a fluid at the second given temperature $\theta 2$. The second two-way shape memory alloy spring 604 is then automatically brought to the second given temperature $\theta 2$ and adopts its second stable state which in the example illustrated corresponds to compression, and remains there because the first housing 542 is lagged. At the same time, the second heat insulated 544 receives a fluid at the fourth given temperature $\theta 4$. The second two-way shape memory alloy spring 604 is then automatically brought to the fourth given temperature $\theta 4$ and adopts its second stable state which corresponds to expansion in the example illustrated, and remains there because the second housing 544 is lagged. The combination of the compression of the first spring 602 and of the expansion of the second spring 604 has the effect of pushing the piston 46 in a second direction, thus driving the rotation of the crank 48 as far as a second extreme position.

Just as in the first embodiment, the arrival of the piston 46 in its first or second extreme position causes said shutter to open or to close.

As a preference, the fluid used is air. Advantageously, this air is tapped from the low-pressure compressor 10 or from the high-pressure compressor 12, all these elements being depicted in FIG. 2.

According to a first embodiment, the first source of fluid is either the inlet or the outlet of the low-pressure compressor 10, while the second source of fluid is either the outlet or the inlet of the low-pressure compressor 10, respectively. According to a second embodiment, the first source of fluid is either the inlet or the outlet of the high-pressure compressor 12, while the second source of fluid is either the outlet or the inlet of the high-pressure compressor 12, respectively.

According to a preferred form of the second embodiment, the shape memory alloy springs are selected such that the temperature of the first stable state of one is identical to the temperature of the second stable state of the other and vice versa. With this preferred form of embodiment, it is possible to produce a feed circuit that is very simple to operate and in which, for example:

the fluid at the first given temperature $\theta 1$ is air tapped from the inlet of the high-pressure compressor 12,
the fluid at the second given temperature $\theta 2$ is air tapped from the outlet of the high-pressure compressor 12,
the fluid at the third given temperature $\theta 3$ is air tapped from the outlet of the high-pressure compressor 12, in which case the two temperatures $\theta 3$ and $\theta 2$ are identical,
the fluid at the fourth given temperature $\theta 4$ is air tapped from the inlet of the high-pressure compressor 12, in which case the two temperatures $\theta 4$ and $\theta 1$ are identical.

One significant advantage of an actuating device 40 according to the invention lies in the fact that it employs two-way shape memory alloys which are capable of switching into one or other of their two stable states when the lagged compartment in which they lie is brought to a given temperature $\theta 1$, $\theta 2$, $\theta 3$, $\theta 4$ by a fluid from an appropriate fluid source which is itself contained within the turbojet engine 2. The significant parameter is not the pressure of the tapped fluid but the temperature of this fluid at the point from which it is tapped. Thus it is possible to use circuits for transporting this fluid which are far simpler and less cumbersome than the compressed-fluid circuits intended for feeding fluid to the hydraulic jacks of the known art.

The invention that has just been described is not restricted to the embodiments described. For example, the shape memory alloy actuator 60, 602, 604 may be a leaf spring rather than a coil spring. Further, the feed circuit in which the fluid is air tapped from the inlet and outlet of the high-pressure compressor 12 is particularly well-suited to the actuation of bypass air bleed shutters positioned in the inter-duct compartment 8 just upstream of the high-pressure compressor 12. Other feed circuits may be envisioned when the shutter or shutters to be actuated is or are positioned at other points in the turbojet engine 2. In this case, the fluid used could be air tapped from the low-pressure compressor 10.

Figure 1:
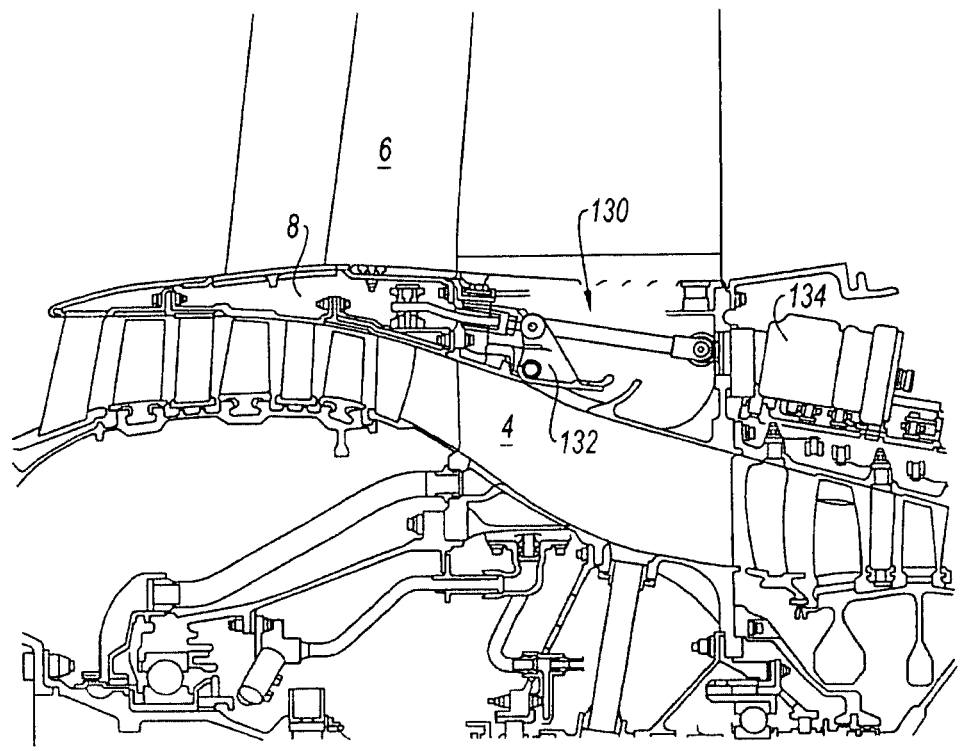
FIG. 1, which has already been described, illustrates in axial section, a bypass air bleed device with actuating jacks according to the known art.
Figure 7:
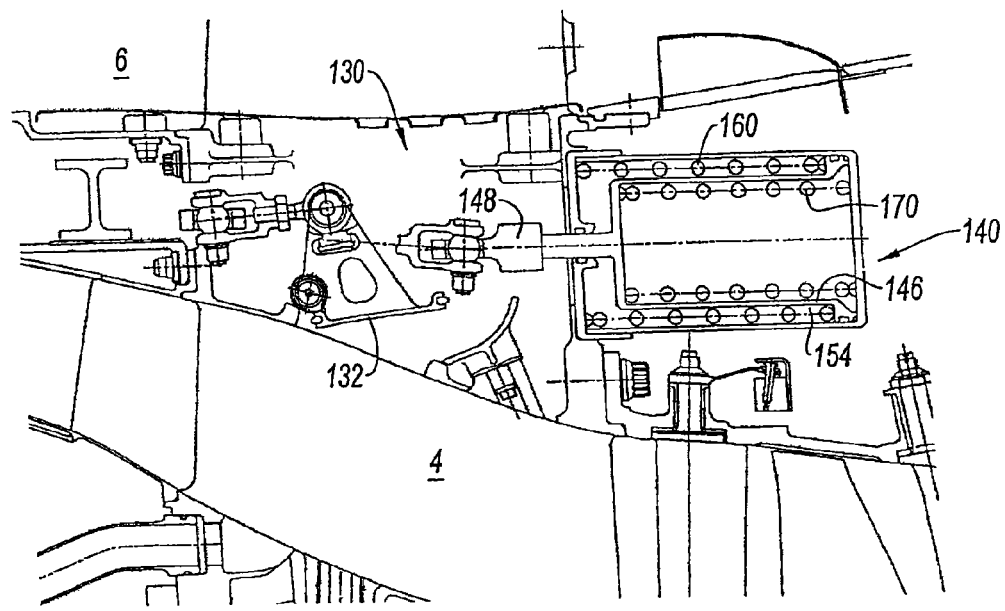
FIGS. 7 and 8 show one example of how an actuating device according to the invention is incorporated into a bypass turbojet engine.
Figure 8:
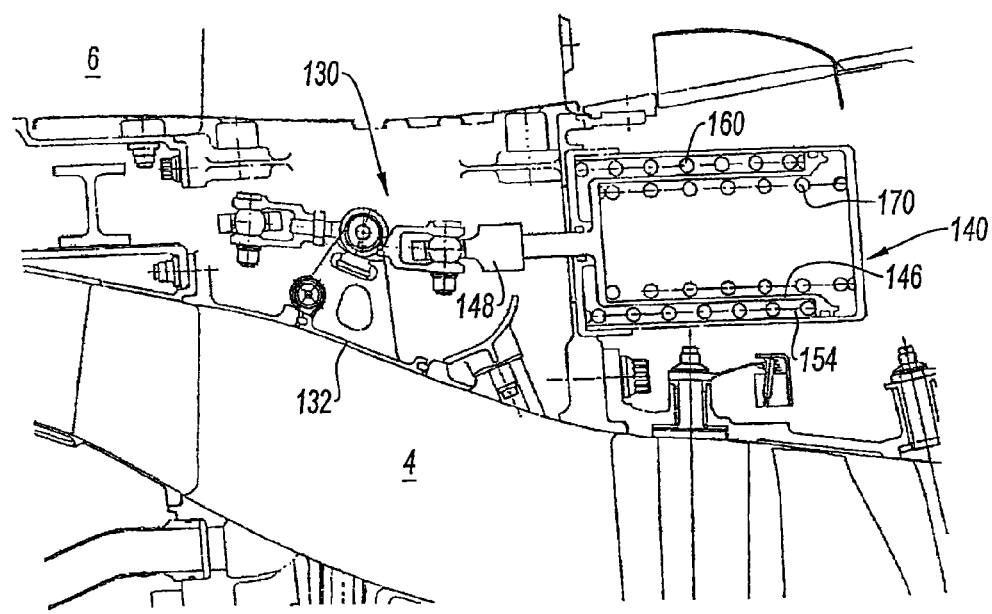

FIGS. 7 and 8 depict the application of an actuator according to the invention to the opening of a bypass air bleed valve in the engine of FIG. 1. The actuator 140 comprises, inside a lagged space 154, a two-way shape memory alloy spring 160 acting on a piston 146. A conventional return spring 170 that has no shape memory effect, applies force on the piston in the opposite direction to that applied by the spring 160. The piston 148 is connected to the shutter 132 by a link rod and an appropriate movement-conversion mechanism. The sources of fluid at different temperatures have not been depicted. In FIG. 7, the spring 160 is, at a first temperature, in its extended state, the return spring 170 being compressed. The shutter 132 is open. In FIG. 8, the spring is at a second temperature, in its compressed state, and the shutter 132 is closed.

What is claimed is:

1. An actuating device for a turbojet engine with a bypass air bleed system and a bypass air bleed shutter, the actuating device comprising: a mechanism that includes a piston which translates between a first position and a second position, and a crank which rotates about an axle based on translational displacement of the piston;
the bypass air bleed shutter connected to the crank;
at least one actuator attached at one end to an end of the piston and made of a shape memory alloy, wherein the actuator is a two-way actuator having a first stable state at a first temperature, in which state the actuator actuates either opening or closing of the shutter by moving the piston to the first position, and a second stable state at a second temperature in which state the actuator actuates the other one of the closing or opening of said shutter by moving the piston to the second position, respectively, and temperature regulating means for bringing the shape memory alloy actuator to the first temperature or to the second temperature, the regulating means comprising a regulating valve, a connecting pipe connected to the regulating valve, a first feed pipe connected to a first source of a fluid brought to the first temperature, and a second feed pipe connected to a second source of a fluid brought to the second temperature, the first and second feed pipes being connected to the regulating valve.

2. The actuating device as claimed in claim 1, further comprising at least one heat insulated space in which the shape memory alloy actuator is positioned.

3. The actuating device as claimed in claim 1 or 2, wherein the connecting pipe opens into the heat insulated space.

4. The actuating device as claimed in claim 1 or 2, comprising a single two-way shape memory alloy actuator which switches to a first stable state when brought to the first temperature and to a second stable state when brought to the second temperature.

5. The actuating device as claimed in claim 1, comprising:
a first two-way shape memory alloy actuator which switches to a first stable state when brought to its first temperature and which switches to a second stable state when brought to its second temperature,
a second two-way shape memory alloy actuator which switches to a first stable state when brought to its first temperature and which switches to a second stable state when brought to its second temperature.

6. The actuating device as claimed in claim 5, wherein the first temperature of the second actuator is substantially identical to the second temperature of the first actuator and the second temperature of the second actuator is substantially identical to the first temperature of the first actuator, so that the first stable state of the second actuator is identical to the second stable state of the first actuator and so that the second stable state of the second actuator is identical to the first stable state of the first actuator.

7. The actuating device as claimed in claim 1, wherein the actuator is a coil spring.

8. The actuating device as claimed in claim 1, wherein the actuator is a leaf spring.

9. A method of operating the actuating device as claimed in claim 1 for opening and closing at least one shutter in a gas turbine engine, the engine comprising at least one element through which a fluid flow passes and having an inlet where the fluid is at an inlet temperature and an outlet where the fluid is at an outlet temperature, wherein the first source of fluid consists of either the inlet or the outlet while the second source of fluid consists of either the outlet or the inlet, respectively, the method comprising:
supplying the first source of fluid to the actuator; and
supplying the second source of fluid to the actuator.

10. The method of operating the actuating device as claimed in claim 9, wherein said element is a compressor of the engine, the first temperature is an air temperature at an inlet to the compressor and the second temperature is an air temperature at an outlet from the compressor.

11. The method of operating the actuating device as claimed in claim 9, wherein said element is a turbine of the engine, the first temperature is an air temperature at an outlet from the turbine and the second temperature is an air temperature at an inlet to the turbine.

12. A turbojet engine comprising:
a primary air flow duct with a secondary air flow duct and a bypass air bleed system with at least one bypass air bleed shutter allowing air to be diverted from the primary duct to the secondary duct; and
at least one actuating device as claimed in claim 1 for opening or closing the bypass air bleed shutter.

13. The turbojet engine as claimed in claim 12, comprising at least one element through which a fluid flow passes and having an inlet where the fluid flow is at an inlet temperature and an outlet where the fluid flow is at an outlet temperature, wherein the regulating valve is fed via the first feed pipe connected to either the inlet or outlet of said element and by the second feed pipe connected to either the outlet or the inlet of said element, respectively, and wherein the regulating valve is controlled by a computer that receives data relating to the operating cycle of the turbojet engine.

14. The actuating device as claimed in claim 1, further comprising a casing which houses the mechanism, the casing including a first housing provided at a first side of the mechanism and a second housing provided at a second side of the mechanism, the first and second housings each houses part of the piston during translational displacement of the piston.

15. The actuating device as claimed in claim 14, wherein one of the first and second housings includes thermal insulation to present a heat insulated space in which the shape memory alloy actuator is positioned.

16. The actuating device as claimed in claim 1, further comprising a return spring that has no shape memory effect, the return spring applying force in an opposite direction to the force applied by the actuator made of the shape memory alloy.

17. The actuating device as claimed in claim 2, wherein another end of the actuator is attached to a wall of the heat insulated space which faces the end of the piston.

* * * * *